United States Patent Office 3,580,844
Patented May 25, 1971

3,580,844
METHOD OF PROCESSING OIL EMULSIONS USED IN METAL MACHINING
Helmut Fratzscher, Gross-Auheim, Kurt Klein, Langen, Hessen, Joachim Maluzi, Gross-Auheim, and Peter Hansen and Werner Schmitz, Wolfgang B. Hanau am Main, Germany, assignors to Deutsche Gold- und Silber-Scheideanstalt vormals Roessler, Frankfurt am Main, Germany
No Drawing. Continuation-in-part of application Ser. No. 654,990, July 21, 1967. This application Nov. 4, 1969, Ser. No. 874,035
Claims priority, application Germany, July 22, 1966, D 50,648; Jan. 19, 1967, D 52,051
Int. Cl. B01d 15/00
U.S. Cl. 210—40                                   3 Claims

ABSTRACT OF THE DISCLOSURE

Aqueous oil emulsions used in metal machining are separated into an aqueous phase and an oily phase by adding a mixture of a formate or acetate of an alkaline earth metal, earth metal, cadmium or zinc to the emulsion to break the emulsion with a finely divided absorbent and adsorb the separating oil, thereby converting the oil to a filterable form and filtering it off.

CROSS-REFERENCES TO RELATED APPLICATIONS

This application is a continuation-in-part of the application Ser. No. 654,990 filed by the same inventors with the same title on July 21, 1967 now abandoned.

BACKGROUND OF THE INVENTION

The invention relates to an improved method for processing oil emulsions used in machining metals to separate a substantially oil free aqueous phase therefrom which is easily disposed of.

Oil-in-water emulsions of emulsifiable metal machining oils which primarily consist of mineral oil, emulsifiers, soaps, stabilizers, wetting agents anticorrodents as well as extremely effective bactericides can depending on their mixing proportions, be used for the most varied metal cutting operations, especially to achieve a high cooling action. Such machining oil compositions upon mixture with water form emulsions having high cooling and lubricant properties when used in machining ferrous and nonferrous metals and exhibit a quick emulsification of the concentrate, high stability of the emulsion, good protection against corrosion, good wetting action, favorable foaming properties and protection against bactericidal action.

The disposal of used metal machining emulsions in sewerage or waste waters however, is accompanied by a number of problems as to avoid pollution of natural waters in which they are to be disposed requires certain purification of such waste waters. The purification of the waste waters can be carried out physically, for example, in clarifying or settling basins, chemically by precipitation or biologically by culturing bacteria.

However, special difficulties are encountered in clarifying waste waters which have been contaminated with used stable and bactericidal metal machining emulsions. Such contaminated waste waters usually must, if possible, be kept separate from normal waste waters, as they require special chemical processing. For economical reasons, the installation employed for separating the emulsified oils from the water in such used emulsions should be kept as small as possible.

According to a proved process, the separation is effected with concentrated sulfuric or hydrochloric acid. The use of sulfuric acid involves the more economical process. The emulsion to be broken is heated to about 80° C. and sulfuric acid is added while stirring mechanically or by introduction of compressed air. The quantity of sulfuric acid employed depends upon the ratio of the oil to water and for instance amounts to about 1.0–2.0 wt.-percent for a ratio of 1:10, 1.0 to 2.0 wt.-percent for a ratio of 1:30, 1.5 to 2.0 wt.-percent for a ratio of 1:50.

The time required for the necessary separation into two phases so that the oil can be drawn off from the water is about 4–5 hours. If the process is carried out at normal ambient temperature such separation only occurs after about 2 to 3 days.

Both in the sulfuric acid and in the hydrochloric acid process it is necessary that the resultant acid containing water be neutralized to a pH of about 6 to 7 with about 2 to 4 wt.-percent of 50% NaOH of 1 to 3 wt.-percent of $Ca(OH)_2$. The cheaper neutralization using $Ca(OH)_2$ when used in connection with the sulfuric acid process has the disadvantage that a precipitate of calcium sulfate is produced which must be removed from the bottom of the neutralizing vessel. The quantity of dissolved sodium sulfate produced when NaOH is used for the neutralization amounts to between about 14 and 28 g. per liter.

When ferrous vessels are used when the emulsion is broken with the acids, it is extremely desirable that they be in the open as hydrogen produced by the action of the acids on the vessels could lead to explosions if they are located in confined spaces.

According to another known process the emulsion can be broken by salting out with ordinary salt or magnesium chloride. Again different quantities of salt are required depending upon the ratio of the oil to water in the emulsions and, for example, can vary between about 5 wt.-percent to 2 wt.-percent with ratios between 1:10 and 1:50.

The time required for the separation is about 4 hours. This process is more economical than the acid process as neutralization of the water phase is not necessary. However, such water phase still contains significant quantities of salt of, for example, between 20 and 50 g. per liter.

According to a third known process the emulsion can be broken by flocculation with iron sulfate or aluminum sulfate solutions. This process probably is the most facile to carry out but it requires rather costly apparatus. It is carried out by adding an iron- or aluminum sulfate solution to the emulsion to be broken and then adjusting the pH of the emulsion to 8–9 by adding 50% NaOH. At this pH iron or aluminum hydroxide is formed and these hydroxides absorb the oil and flock out as a hydroxide-oil sludge. The water which separates off above the precipitates can be withdrawn from above. The time required for breaking a 1:30 emulsion upon addition of 1–2 wt.-percent of sulfate is about 4–5 hours.

The three processes described differ from each other in their economics as well as in the condition of the water which is separated off. The selection of the process depends upon what limits are prescribed by the authorities concerned. It may be pointed out that dilution of waste water, for instance, when it has too high a salt content, is prohibited by law. None of the processes described renders it possible to obtain a waste water completely free of oil. In the first two processes the residual oil content is about 50 mg./liter and in the third it is about 20 mg./liter as a maximum.

SUMMARY OF THE INVENTION

The object of the invention is to provide a method for processing metal machining oil emulsions into a pure aqueous phase and a phase containing the impurities which renders possible a far-reaching freedom of oil in the waste water by rapid breaking of the emulsions.

The essence of the invention resides in that a mixture of water soluble formates or acetates of alkaline earth metals, earth metals, cadmium or zinc in dissolved or dry form with a solid finely divided adsorption agent is added to the emulsion which will convert the oil portion that separates out into a filterable form whereupon both phases can be separated out by filtration.

DESCRIPTION OF THE PREFERRED EMBODIMENT

Expediently formates or acetates of the alkaline earth metals or the earth metals are used for breaking the emulsions in admixture with the adsorbents. In addition, the corresponding salts of cadmium and zinc also have been found suitable for breaking the emulsions.

Finely divided, hydrophobic pyrogenic silicas or wet precipitated silicas or silicates or organically modified wet precipitated silicas or silicates or their mixtures may be employed as the absorbents used according to the invention.

Finely divided wet precipitated silicas as well as pyrogenic silicas produced by pyrogenic decomposition of volatile silicon halides which have been hydrophobized in a known manner with organohalosilanes such as dimethyl dichlorosilanes can be used as the hydrophobic silicas. For instance, a pyrogenic silica having hydrophobic properties engendered by bound methyl groups, produced by treatment with dimethyl dichlorosilane having a BET surface area of about 150 m.$^2$/g. and an average particle size of about 20 m$\mu$ and a carbon content (derived from $CH_3$) of about 1.2–1.6%, corresponding to about 0.8 mol $CH_3$ per 100 m.$^2$ or a wet precipitated silica similarly hydrophobized with a carbon content of about 2.80% and a BET surface area of about 100 to 150 m.$^2$/g. are especially suited as adsorbents. In addition, organically modified wet precipitated silicas obtained by precipitation in the presence of polymeric water soluble organic compounds with reactive groups can also be used. Such organically modified silicas can, for instance, be produced by the process described in application S.N. 646,452, filed June 16, 1967 now abandoned.

However, all types of carbon blacks or active carbon and charcoal or their mixtures with hydrophobic or organophilic adsorbents can be used with special advantage. The use of such carbonaceous adsorbents is not only of advantage because of their especially high adsorbent capacity but also is of special advantage during the subsequent elimination of the absorbent oil cake which in most instances is effected by combustion as it can be burned with almost no residue.

In addition, finely divided natural adsorbents which have organophilic properties, especially, kieselguhr, or their mixtures with finely divided hydrophobic substances, especially, hydrophobic silica, can also be used according to the invention.

Furthermore, water insoluble substances which in addition to organophilic surface properties also possess hydrophilic properties and in some instances are only temporarily oil adsorptive can be used as the adsorbents according to the invention. Such substances may, for instance, be natural minerals and silicates, active finely divided oxides and silicates produced by wet precipitation, such as, silica and alumina, as well as subdivided natural or synthetic organic products.

The number of effective adsorbent substances is practically unlimited as substances with greater or lesser absorptive or adsorptive capacity, such as, infusorial earth, diatomic earth, bleaching earth on the one hand and, on the other hand, peat meal, wool meal, sawdust, cork meal, latex powder, Styropor powder, resin granulates, commercial plastic foams, rubber meal, textile fibers and the like up to dry coffee grounds can be used.

The presence of these adsorbents during the breaking of the emulsion, that is simultaneously with the demulsifying agent, is necessary, as in the absence of the absorbent, the emulsifier which is set free along with the oil when the emulsion is broken has a remulsifying action and therefore hinders complete breaking of the emulsion. As a consequence, a residual portion of the emulsion is always retained and an equilibrium is established so that certain quantities of oil remain in the waste water.

In the presence of the adsorbent the oil phase which is set free when the emulsion is broken is bound in nascent state on the adsorbent and therefore is withdrawn from the system and not available for re-emulsification. The breaking of the emulsion therefore proceeds practically quantitatively and therefore provides an optimal oil-free waste water. The oil bound on the adsorbent is semi-solid to solid and is considerably simpler to handle in further processing or burning than, for example, the smearly liquid oil phase obtained with the previously employed processes.

It is therefore preferred to add the adsorbent and acetate or formate in a preformed, prepacked mixture. This will assure simultaneous pressure of both components and will relieve the user of the necessity in each instance to determine and measure the required amounts.

The adsorbents employed depend upon the nature of the oil or emulsion concerned and can be strongly hydrophobic or at least organophilic (even with some hydrophilic properties) so as to give at least temporary but at least sufficient adsorption during the time required for the process even though such adsorption may be rather loose.

The emulsion breaking agents are employed in quantities of at least about 0.5 to about 10 wt. percent based on the oil in the emulsion. The quantity of adsorbent employed is about 35 to 75 wt. percent based on the wt. percent of the oil contained in the emulsion. When mixtures of emulsion breaking agents and adsorption agents are employed, the quantity of such mixture added to the emulsion should be about 10 to 50 wt. percent (in the case of use of adsorbents which are not decidedly hydrophobic up to 80 wt. percent based upon the oil in the emulsion.

A preferred form of the invention comprises the use of a ready mixture set up as a separate article of commerce and comprising calcium formate with hydrophobized pyrogenic silica in amounts as indicated. Different ratios of the compounds can be supplied as separate items.

The emulsions can be treated with the emulsion breaking and adsorption agent at boiling temperatures or also at room temperature. After the emulsion is broken, the oil phase is separated from the aqueous phase by filtration.

The process according to the invention is not only suited for processing metal machining oils but also other emulsion forming oils, fats or oily substances by breaking the emulsions thereof and adsorption of the oil content to keep it from waste waters.

The concentration of the part of the oil in the oil emulsion may range between 0.1 and 20% of weight.

The following examples will serve to illustrate the process according to the invention with reference to a number of representative embodiments thereof.

Example 1

100 ml. of a cutting oil emulsion (2 g. of cutting oil concentrate diluted in 100 ml. of water) were treated with a prepared mixture containing 1.09 g. of 90 wt. parts of a hydrophobized pyrogenic silica having the properties described above "Aerosol R 972" and 10 wt. parts of calcium formate at boiling temperature. The emulsion broke in about 3–5 minutes. Upon filtration a substantially oil and impurity free clear aqueous phase was obtained. The impurities carried over into the aqueous phase only amount to 0.08% of HCOOH.

In contrast thereto, the impurities remaining in the recovered aqueous phase when the usual processing methods are employed amount to 2 to 5% of acids or salts with a processing time of 4 to 5 hours at 80° C. In view of the laws in effect in certain localities such aqueous phase cannot be discharged into open waters either diluted or indiluted.

Example 2

30–35 wt. percent of a mixture of 85 wt. parts of carbon black as an organophilic adsorption agent and 15 wt. parts of zinc acetate were well stirred into a cutting oil emulsion, the percentage being based upon the oil content of such emulsion. After about 5 minutes the emulsion was broken and the crumbly carbon black-oil cake produced was in a well filterable form.

The purity of the waste water obtained in such processing of the cutting oil amounted to 10 mg. of residual oil per liter (determined according to H 17 of Deutsche Einheitsmethoden zur Wasseruntersuchung (uniform German Methods for Water Examination)).

Analogous results were obtained when finely divided active carbon or charcoal mixtures of any desired quantity of hydrophobized silica with the carbon black, active carbon or charcoal was employed instead of the carbon black and when zinc formate or acetate or formates of calcium, barium, cadmium and aluminum were employed instead of the zinc acetate.

Example 3

30 to 80 wt. percent of a mixture of 85 parts by weight of kieselguhr, as a natural finely divided organophilic adsorbent, with 15 wt. parts of calcium acetate were stirred into a cutting oil emulsion at room temperature, the percentage being based upon the oil content of the emulsion. The emulsion broke after about 5 minutes and the kieselguhr oil cake was obtained in a well filterable form.

The purity of the waste water obtained in such processing was 10 mg. of residual oil per liter determined according to H 17.

Similar results were obtained when the calcium acetate was replaced by calcium formate or a formate or acetate of barium, zinc, cadmium or aluminum. Similar results were also obtained when mixtures of kieselguhr and hydrophobic silica were used in place of the kieselguhr.

It is also possible to employ hydrophilic adsorbents of the nature described above.

Materials which are designated herein as at least organophilic are intended to include such materials as have hydrophilic properties in addition to organophilic properties, as well as materials which have hydrophobic properties.

The metal machining oil may for example comprise:

| | Percent |
|---|---|
| Mineral oil | 90 |
| Emulsifier | 8 |
| Antioxidants (nitrite) | 1 |
| Age preventing agents (for example silicone oil | 1 | and water.

We claim:

1. A method of processing aqueous oil emulsions into a purified aqueous phase and an oil and impurities-containing phase which comprises adding to the oil emulsion a preformed mixture comprising (a) a salt selected from the group consisting of water-soluble formates and acetates of the alkaline earth metals, the earth metals, cadmium and zinc and (b) a finely divided organophilic adsorbent selected from the group consisting of hydrophobized pyrogenic silica, hydrophobized wet precipitated silica, carbon black kieselguhr and mixtures of these materials, the amount of the formate or acetate being between about 0.5 and 10% by weight and the amount of the adsorbent being between about 35 and 70% by weight, both percentages being based upon the oil content of the emulsion, and the mixture of the formate or acetate and adsorbent containing between 2 and 5 parts by weight of the formate or acetate per 100 parts by weight of the adsorbent, whereby the emulsion is broken and the oil separated and converted into a form suitable for filtration, and filtering off the thus-adsorbed separated oil.

2. The process of claim 1, wherein the adsorbent is selected from the group consisting of hydrophobized pyrogenic silica, hydrophobized wet precipitated silica, carbon black, kieselguhr and mixtures of these materials.

3. The process of claim 1, wherein a preformed mixture of calcium formate and hydrophobized silica is added to the emulsion.

References Cited

UNITED STATES PATENTS

| 705,253 | 7/1902 | Krause | 210—40X |
| 2,464,204 | 3/1949 | Baker | 210—40X |
| 2,047,989 | 7/1936 | Woelflin | 252—328 |
| 3,252,899 | 5/1966 | Rice et al. | 210—40 |

SAMIH N. ZAHARNA, Primary Examiner

U.S. Cl. X.R.

252—328